United States Patent [19]
Pamer

[11] 3,827,366
[45] Aug. 6, 1974

[54] MATERIAL HANDLING APPARATUS
[75] Inventor: Karl A. Pamer, Chagrin Falls, Ohio
[73] Assignee: McNeil Corporation, Wickliffe, Ohio
[22] Filed: June 9, 1972
[21] Appl. No.: 261,529

[52] U.S. Cl.............. 104/89, 105/155, 105/150, 248/18, 267/137, 104/94
[51] Int. Cl............................................ B61b 3/00
[58] Field of Search........ 267/152, 153, 65 R, 65 A, 267/136, 137; 104/89, 93, 94, 95, 172 S; 105/148, 150, 154, 155; 248/15, 18, 20

[56] References Cited
UNITED STATES PATENTS
| | | | |
|---|---|---|---|
| 1,663,690 | 3/1928 | Ellis | 104/95 |
| 3,415,470 | 12/1968 | Woodford et al. | 248/15 X |
| 3,462,792 | 8/1969 | Greco | 104/94 X |
| 3,612,506 | 10/1971 | Malherbe | 267/152 |

*Primary Examiner*—Frank E. Werner
*Attorney, Agent, or Firm*—Watts, Hoffman, Fisher & Heinke

[57] ABSTRACT

Overhead monorail material handling devices having parts supported by resilient, flexible closed vessels or containers filled with fluid. In some applications a plurality of such vessels or containers are connected by conduit means so that the liquid therein can flow from one to another.

24 Claims, 4 Drawing Figures

MATERIAL HANDLING APPARATUS

BACKGROUND OF THE INVENTION

1. Field of Invention

The invention relates to material handling apparatus and more particularly to the support of a part thereof on a resilient, flexible closed vessel or container filled with fluid.

2. Description of the prior art

Material handling apparatus having a part thereof supported by springs, ball and socket devices and the like, are known but such devices are not entirely satisfactory for various reasons. Springs, for example, are typically not of the correct strength and/or resiliencey for the applications in which they are used and ball and socket devices are friction devices. A typical prior art monorail multi-truck load carrier and a like rail suspension are shown in U.S. Pat. Nos. to Nelles, 2,228,034 and Dehn, et al. 3,095,174.

SUMMARY OF THE INVENTION

The invention provides a novel and improved material handling apparatus, especially of the overhead, permanent installation type, such as, overhead monorail, suspended or underslung trolley systems, in which parts are supported by one or more resilient, flexible, closed containers or vessels filled with fluid or a gelatinous substance, preferably, a liquid which provides limited universal relative frictionless movement between the parts in contact therewith. Where more than one vessel is employed a plurality of the vessels are preferably filled with fluid and connected by conduit means to provide for the flow of fluid from one to the other.

The invention further provides novel and improved crane and monorail material handling apparatus easy to install, reliable and quiet in operation, resistant to transmission of shock loads between different parts, in which loads are equalized between multiple supports, and incorporating numerous safety features not present in prior system.

DESCRIPTION OF A PREFERRED EMBODIMENT

The invention is susceptible of embodiments in innumerable material handling applications, but has especial utility in overhead monorail material handling systems and bridge cranes, and is herein shown as embodied in such equipment or apparatus.

Figure 1:
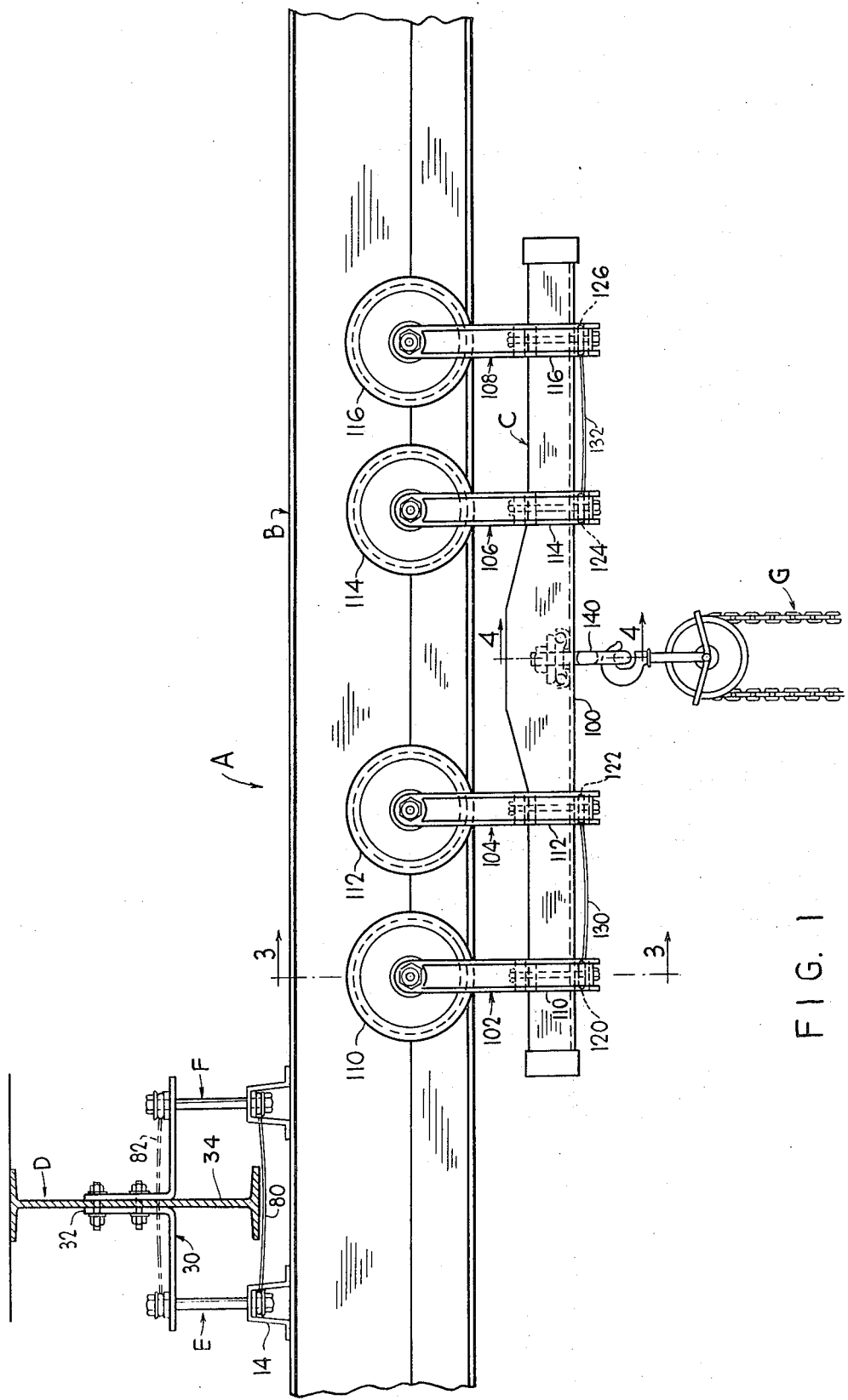
FIG. 1 is a fragmentary view of an overhead monorail material carrier system embodying the present invention.
Figure 2:
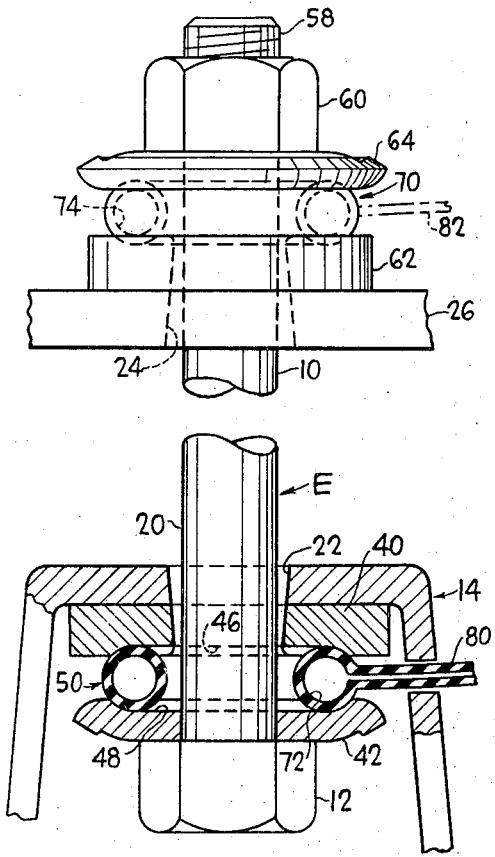
FIG. 2 is an enlarged view, with parts in section, of a portion of FIG. 1.
Figure 3:
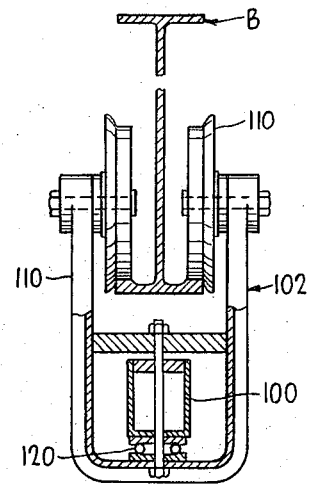
FIG. 3 is an enlarged sectional view, with parts in elevation, approximately on the line 3—3 of FIG. 1.
Figure 4:
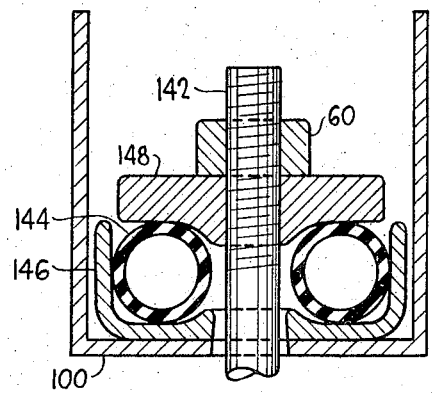
FIG. 4 is an enlarged sectional view, with parts in elevation, approximately on the line 4—4 of FIG. 1.

Referring to FIG. 1 of the drawings, the reference character A designates generally an overhead, monorail, material handling system comprising an I-shaped overhead monorail B along which a trolley C is movable. The trolley C, illustrated, is of the hand-propelled, carrier type. The term "trolley" as herein employed refers to any monorail equipment supported by and movable along the rail B such as hand and/or power-propelled carriers, tractors, crane trucks, etc. The rail B is suspended from an overhead support D such as an I-beam girder of a building by suspension supports E, F.

Because of the relatively low ceiling or overhead clearance in many buildings in which overhead monorail material handling systems are installed, it is highly desirable, if not a necessity, to install the overhead track closely adjacent to the underside of the overhead building structure with suspension supports connected to the overhead support above the lower side thereof and preferably by the use of suspension supports or suspensions at both sides of the overhead support, as illustrated in the drawings.

The suspension supports E, F, illustrated, are duplicates of one another and only the support E is shown and described in detail. Where corresponding parts of the support F are identified and/or referred to, the same reference character is employed as for the support E, but having a prime mark applied thereto.

The support E comprises a hanger member in the form of a bolt 10 having its head 12 located within a channel-shaped bracket 14 suitably secured to the upper flange 16 of the I-shaped rail B and its shank 20 projecting upwardly through a suitable aperture 22 in the bracket 14 and through a similar aperture 24 in a horizontal flange 26 of an angle bracket 30, the vertical flange 32 of which is secured, as by bolts, to the web of the I-beam 34 of the overhead support D. Two spaced devices, for example washers 40, 42 are positioned on the shank 20 of the bolt 10 between the web of the bracket 14 and the bearing surface of the head 12 of the bolt. The facing sides or surfaces of the washers 40, 42, have annular depressions 46, 48, therein, respectively, for the location and centering of a resilient, flexible ring-like closed container or vessel member 50 having fluid therein interposed therebetween. The upper threaded end 58 of the shank of the bolt 10 is provided with a nut 60 threaded thereon and interposed between the bearing face thereof and the upper surface of the horizontal flange 26 of the bracket 30 are washers 62, 64, similar in construction to the washers 40, 42, respectively. A resilient, flexible vessel or member 70, similar to the members 50, is positioned between the recessed facing sides of the washers 62, 64. The I-beam 34, bracket 30 and washer 62 form the overhead support member for the supported rail member or assembly including the rail B, bracket 14 and washer 40. The apertures in the bracket 14, bracket flange 26 and washers 40, 62 are larger than the shank of the bolt extending therethrough as are the apertures in the resilient members 50, 70. The resilient, flexible members 50, 70 are hollow, that is, they have ring-like closed chambers 72, 74 in the interior thereof. These chambers are filled with fluid, preferably liquid.

The construction is such that the load or weight of the rail B and any trolleys C traveling therealong is transferred to the overhead support D through the members 50, 70. The members 50, 70 are flexible and resilient, and with the clearance between the shank 20 of the bolt 10 and the apertures 22 in the bracket 14 and washer 40 and the apertures 24 in the flange 26 of the bracket 30 and washer 62 provide limited universal movement of the washers 42, 64 relative to the washers 40, 62, respectively, thus permitting the bolt 10 to self-center and transmit the load vertically and uniformly and reduces any tendency to bend the bolt. The members 50, 70 also reduce the transmission of vibrations and sound between the rail and the overhead supporting structure, thus reducing shock loading of the bolt 10, bracket 30 and building structure due to travel of carriers along the rail B, thus extending the fatigue life of the bolt, etc. The members 50, 70 also eliminate lateral and longitudinal shock loadings of the building structure.

In applications where a plurality of closely spaced supports are employed, the closed fluid filled vessel or container members, preferably have two or more of their respective interior chambers connected by a conduit so that they are in communication with one another and the fluid therein can flow from one to another. In the embodiment illustrated the interior chambers 72, 72' of the members 50, 50' are connected by a conduit 80 so that fluid in the chambers 72, 72' can flow back and forth from one chamber to the other. The interior chambers 74, 74' of the members 70, 70' may be similarly connected by a conduit 82 extending through a suitable opening in the overhead support D. Either of the connections 80, 82 equalize, between the two bolts of the supports, the load or weight of the rail, etc. thereon and in the members 50, 50'. This reduces shock loading of the bolts due to rail deflection incident to the movement of a trolley therealong, results in low impact transfer of the load from one support to the other in the event one support fails, and provides a rail leveling function as the rail is subjected to changing load conditions, etc.

The carrier-type trolley C illustrated, comprises a load bar 100 carried by a plurality of trucks 102, 104, 106, 108 having clevis-like or U-shaped frame members 110, 112, 114, 116, respectively. The distal end of the truck frame members are provided with wheels which engage and travel along parts of the lower flange of the I-shaped rail B at opposite sides of the web of the rail. The load bar 100 is supported in the truck frame members by resilient, flexible ring-like members 120, 122, 124, 126 similar to the members 50, 70 previously described. The load bar shown is channel-shaped in cross section and a single resilient member 120 is positioned between the underside of the web of the load bar and the horizontal part of the frame of the truck therebelow. In the trolley illustrated the four trucks are arranged in pairs adjacent to opposite ends of the load bar and the interior chambers of the members 120, 122 and 124, 126 at opposite ends of the trolley are connected to one another by conduit means 130, 132, respectively. Any two or more of the members 120, 122, 124, 126 could be connected to one another, as desired. Washers similar to the washers 40, 62, previously referred to, are employed at opposite ends of the members 120, 122, 124, 126 between the lower side of the load bar 100 and the upper side of the truck frame. The construction is simple, inexpensive and reliable and distributes the load equally between the trucks.

The trolley C, shown, has a load grab or support G attached to the load bar 100 midway between its ends by an I-bolt 140 having a threaded shank 142 which is connected to the load bar through a member 144 similar to the members 50, 70 so as to reduce and/or eliminate the transmission of vibrations, shock load, etc., between the load grab and the load bar. The washer or washer-like members, 146, 148 located at opposite ends of the fluid filled container 144 are so constructed that they substantially enclose the member 144. For this purpose the lower member 146 includes an upwardly projecting skirt or annular flange extending adjacent to or, if desired, slightly above the lower surface of the member 148. Adequate area is provided between the members 144. The enclosing or partially enclosing of the member 144 permits the member to be made smaller and/or constructed with side walls of less tensil strength and greater resiliency and flexibility for any given design load than would otherwise be the case. The apertures in the load bar 100 and the washer 146 through which the shank of the I-bolt 142 project are larger than the shank of the I-bolt thus permitting the I-bolt to center itself in the load bar and have limited universal movement with respect thereto.

The fluid-filled vessel members need not necessarily be ring-like in configuration but may be of any suitable shape, for example, cubical, and if ring-like they need not be circular. The preferred configuration, however, is one which provides end surfaces for engagement by the oppositely facing abutment surfaces of the members between which they are employed. The extent to which the vessel members are compressed by any given load will be a function of their size, wall thickness, and the tensil strength and elasticity of the material of which they are made, etc. Obviously the fluid-filled vessel or container members must be of a construction such that the load to which they are subject will not compress them sufficient to allow facing surfaces of the washers or other members engaging opposite ends thereof to contact one another. Where the fluid-filled closed container members are of ring-like configuration their transverse cross-sectional configuration may be of any suitable shape. Because of the flexibility and resiliency of the closed vessel or container members and the fluid therein, the force or thrust transmitted thereby from one member engaged therewith to another at the opposite end will be uniformly distributed throughout the members.

One of the important advantages of the present invention is the fact that it provides an overhead material handling apparatus which is far safer than prior systems because the supports for the rail are less liable to failure. This is particularly important because personnel is often working underneath such installations.

As a further safety feature, where liquid is employed within the closed resilient vessel members, the liquid can be colored so that in the event of rupture of a member such failure will be quickly detected and identified because of the dripping of color liquid therefrom over the equipment and/or objects beneath the system.

From the foregoing description of preferred embodiments of the invention it will be apparent that the objects and advantages of the invention heretofore mentioned and others have been accomplished and that there has been provided a novel and improved overhead material handling apparatus which has many features, safety and otherwise, not incorporated in prior apparatuses.

While certain embodiments of the invention have been illustrated, described and referred to, as previously mentioned, the invention may be otherwise embodied, and while a single closed vessel or container member filled with fluid has been employed between the spaced abutment surfaces of the different support and supported members shown, it will be obvious that any number of such members may be employed, stacked one upon another, connected by conduit means, as desired.

Having thus described my invention, what I claim is:

1. In an overhead, underslung carrier-type material handling system: an overhead member having a vertical opening therethrough; a rail member having a vertical opening therethrough beneath the opening through said overhead member; a rod-like member extending through said openings; means connected to said rod-like member providing abutment surfaces facing in the direction of one another and at opposite sides of said overhead and rail members from one another; and a discrete, resilient, flexible, ring-like closed vessel having fluid therein surrounding said rod-like member and between one of said overhead and rail members and the said abutment surface adajcent thereto; said opening in said one of said overhead and rail members being larger than said rod-like member extending therethrough whereby said rod-like member has limited universal movement relative to said one of said overhead and rail members.

2. In an overhead, underslung carrier-type material handling system: an overhead member having a plurality of side-by-side openings therethrough; a rail member having a plurality of side-by-side openings therethrough one beneath each of the openings through said overhead member; side-by-side rod-like members extending through said side-by-side openings in said overhead and rail members; means connected to said rod-like members providing abutment surfaces surrounding the respective rod-like members facing in the direction of one another and at opposite sides of said overhead and rail members from one another; discrete, resilient, flexible, ring-like closed vessels connected by a conduit surrounding said rod-like members and between one of said overhead and rail members and the said abutment surfaces adjacent thereto; and fluid within said chambers and said conduit; said openings in said one of said overhead and rail members being larger than said rod-like members extending therethrough whereby said rod-like members have limited universal movement relative to said one of said overhead and rail members.

3. In an overhead, underslung carrier-type material handling system: an overhead member, a rail member, a hanger member providing abutment surfaces facing in the direction of one another and at opposite sides of said overhead and rail members from one another, and a discrete, resilient, flexible closed vessel having fluid therein between one of said overhead an rail members and the said abutment surface adjacent thereto whereby said hanger member has limited universal movement relative to said one of said overhead and rail members.

4. In an overhead, underslung carrier-type material handling system: an overhead member; a rail member; side-by-side hanger members providing abutment surfaces facing in the direction of one another and at opposite sides of said overhead and rail members from one another; and discrete resilient, flexible, closed vessels connected by a conduit and having fluid therein between one of said overhead and rail members and the said abutment surfaces adjacent thereto whereby said hanger members have limited universal movement relative to said one of said overhead and rail members.

5. In an overhead, underslung carrier-type material handling system: an overhead member, a rail member; a hanger member providing abutment surfaces facing in the direction of one another and at opposite sides of said overhead and rail members from one another; and a discrete, resilient, flexible, closed vessel having liquid therein between said overhead and rail members and each said abutment surfaces adjacent thereto whereby said rod-like member has limited universal movement relative to said one of said overhead and rail members.

6. In an overhead, underslung carrier-type material handling system: an overhead member; a rail member; side-by-side hanger members providing abutment surfaces facing in the direction of one another and at opposite sides of said overhead and rail members from one another; discrete, resilient, flexible, closed vessels between said overhead and rail members and each said abutment surfaces adjacent thereto; conduit means connecting said vessels between said overhead support and said abutment surfaces adjacent thereto; conduit means connecting said vessels between said rail member and said abutment surfaces adjacent thereto; and liquid within said chambers and said conduit means; wehreby said hanger members have limited universal movement relative to said one of said overhead and rail members.

7. In an overhead, underslung carrier-type material handling system; an overhead member having a vertical opening therethrough; a rail member having a vertical opening therethrough beneath the opening through said overhead member; a rod-like member extending through said openings; devices on said rod-like member providing abutment surfaces facing in the direction of one another and at opposite sides of said overhead and rail members from one another; and a discrete, resilient, flexible closed vessel having fluid therein between one of said overhead and rail members and the said abutment surface adjacent thereto; said opening in said one of said overhead and rail members being larger than said rod-like member extending therethrough whereby said rod-like member has limited universal movement relative to said one of said overhead and rail members.

8. In an overhead, underslung carrier-type material handling system: an overhead member having a plurality of side-by-side openings therethrough; a rail member having a plurality of side-by-side openings therethrough one beneath each of the openings through said overhead member; side-by-side rod-like members extending through said side-by-side openings in said overhead and rail members; devices on said rod-like members providing abutment surfaces facing in the direction of one another and at opposite sides of said overhead and rail members from one another; discrete, resilient, flexible closed vessels connected by a conduit between one of said overhead and rail members and the said abutment surfaces adjacent thereto; and fluid within said chambers and said conduit means; said openings in said one of said overhead and rail members being larger than said rod-like members extending therethrough whereby said rod-like members have limited universal movement relative to said one of said overhead and rail members.

9. In an overhead, underslung carrier-type material handling system; an overhead member having a vertical opening therethrough; a rail member having a vertical opening therethrough beneath the opening through said overhead member; a rod-like member extending through said openings, devices on said rod-like member providing abutment surfaces facing in the direction of one another and at opposite sides of said overhead and rail members from one another; and a discrete, resilient, flexible, closed vessel having fluid therein between said overhead and rail members and each said abutment surfaces adjacent thereto; said opening in said one of said overhead and rail members being larger than said rod-like member extending therethrough whereby said rod-like member has limited universal movement relative to said one of said overhead and rail members.

10. In an overhead, underslung carrier-type material handling system: an overhead member having a plurality of side-by-side openings therethrough; a rail member having a plurality of side-by-side openings therethrough one beneath each of the openings through said overhead member; side-by-side rod-like members extending through said side-by-side openings in said overhead and rail members; devices on said rod-like members providing abutment surfaces surrounding the respective rod-like members facing in the direction of one another and at opposite sides of said overhead and rail members from one another; discrete, resilient, flexible, closed vessels between said overhead and rail members and each said abutment surfaces adjacent thereto; conduit means connecting said vessels between said overhead support and said abutment surfaces adjacent thereto; conduit means connecting said vessels between said rail member and said abutment surfaces adjacent thereto; and fluid within said chambers and said conduit means; said openings in said overhead and rail members being larger than said rod-like members extending therethrough whereby said rod-like members have limited universal movement relative to said one of said overhead and rail members.

11. In an overhead, underslung carrier-type material handling system; an overhead member having a vertical opening therethrough; a rail member having a vertical opening therethrough beneath the opening through said overhead member; a rod-like member extending through said openings, devices on said rod-like member providing abutment surfaces facing in the direction of one another and at opposite sides of said overhead and rail members from one another; and a discrete, resilient, flexible, ring-like closed vessel having fluid therein surrounding said rod-like member and between said overhead and rail members and each said abutment surfaces adjacent thereto; said opening in said overhead and rail members being larger than said rod-like member extending therethrough whereby said rod-like member has limited relative universal movement relative to said overhead and rail members.

12. In an overhead, underslung carrier-type material handling system: an overhead member having a plurality of side-by-side openings therethrough; a rail member having a plurality of side-by-side openings therethrough one beneath each of the openings through said overhead member; side-by-side rod-like members extending through said side-by-side openings in said overhead and rail members; devices on each of said rod-like members providing abutment surfaces surrounding the respective rod-like members facing in the direction of one another and at opposite sides of said overhead and rail members from one another; discrete, resilient, flexible, ring-like closed vessels surrounding said rod-like members and interposed between said overhead and rail members and each said abutment surfaces adjacent thereto; conduit means connecting one of said vessels between said overhead support and said abutment surfaces adjacent thereto; and one of said vessels between said rail member and said abutment surfaces adjacent thereto; and fluid within said chambers and said conduit means; said opening in said overhead and rail members being larger than said rod-like members extending therethrough whereby said rod-like members have limited relative universal movement relative to said overhead and rail members.

13. In an overhead, underslung carrier-type material handling system an overhead member having a vertical opening therethrough, a rail member having a vertical opening therethrough beneath the opening through said overhead member, a rod-like member extending through said openings, devices on said rod-like member providing abutment surfaces facing in the direction of one another and at opposite sides of said overhead and rail members from one another, and a discrete, resilient, flexible closed vessel having liquid therein between one of said overhead and rail members and the said abutment surface adjacent thereto, said opening in said one of said overhead and rail members being larger than said rod-like member extending therethrough whereby said rod-like member has limited universal movement relative to said one of said overhead and rail members.

14. In an overhead, underslung carrier-type material handling system: an overhead member having a plurality of side-by-side openings therethrough; a rail member having a plurality of side-by-side openings therethrough one beneath each of the openings through said overhead member; side-by-side rod-like members extending through said side-by-side openings in said overhead and rail members; devices on said rod-like members providing abutment surfaces surrounding the respective rod-like members facing in the direction of one another and at opposite sides of said overhead and rail members from one another; discrete, resilient, flexible closed vessels connected by a conduit between one of said overhead and rail members and the said abutment surfaces adjacent thereto; and liquid within said chambers and said conduit means; said openings in said one of said overhead and rail members being larger than said rod-like members extending therethrough whereby said rod-like members have limited universal movement relative to said one of said overhead and rail members.

15. In an overhead, underslung carrier-type material handling system an overhead member having a vertical opening therethrough, a rail member having a vertical opening therethrough beneath the opening through said overhead member, a rod-like member extending through said openings, devices on said rod-like member providing abutment surfaces facing in the direction of one another and at opposite sides of said overhead and rail members from one another, and a discrete, resilient, flexible, ring-like closed vessel having liquid therein surrounding said rod-like member and between one of said overhead and rail members and the said abutment surface adjacent thereto, said opening in said one of said overhead and rail members being larger than said rod-like member extending therethrough whereby said rod-like member has limited universal movement relative to said one of said overhead and rail members.

16. In an overhead, underslung carrier-type material handling system: an overhead member having a plurality of side-by-side openings therethrough; a rail member having a plurality of side-by-side openings therethrough one beneath each of the openings through said overhead member; side-by-side rod-like members extending through said side-by-side openings in said overhead and rail members; devices on said rod-like members facing in the direction of one another and at opposite sides of said overhead and rail members from one another; discrete, resilient, flexible, ring-like closed vessels connected by a conduit surrounding said rod-like members and between one of said overhead and rail members and the said abutment surfaces adjacent thereto; and liquid within said chambers and said conduit means, said openings in said one of said overhead and rail members being larger than said rod-like members extending therethrough whereby said rod-like members have limited universal movement relative to said one of said overhead and rail members.

17. In an overhead, underslung carrier-type material handling system: an overhead member having a vertical opening therethrough, a rail member having a vertical opening therethrough beneath the opening through said overhead member; a rod-like member extending through said openings; devices on said rod-like member providing abutment surfaces facing in the direction of one another and at opposite sides of said overhead and rail members from one another; and a discrete, resilient, flexible, closed vessel having liquid therein between said overhead and rail members and each said abutment surfaces adjacent thereto; said opening in said one of said overhead and rail members being larger than said rod-like member extending therethrough whereby said rod-like member has limited universal movement relative to said one of said overhead and rail members.

18. In an overhead, underslung carrier-type material handling system: an overhead member having a plurality of side-by-side openings therethrough; a rail member having a plurality of side-by-side openings therethrough one beneath each of the openings through said overhead member; side-by-side rod-like members extending through said side-by-side openings in said overhead and rail members; devices on said rod-like members providing abutment surfaces surrounding the respective rod-like members facing in the direction of one another and at opposite sides of said overhead and rail members from one another; discrete, resilient, flexible, closed vessels between said overhead and rail members and each said abutment surfaces adjacent thereto; conduit means connecting one of said vessels between said overhead support and said abutment surfaces adjacent thereto and one of said vessels between said rail member and said abutment surfaces adjacent thereto; and liquid within said chambers and said conduit means; said openings in said overhead and rail members being larger than said rod-like members extending therethrough whereby said rod-like members have limited universal movement relative to said one of said overhead and rail members.

19. In an overhead, underslung carrier-type material handling system: an overhead member having a vertical opening therethrough; a rail member having a vertical opening therethrough beneath the opening through said overhead member; a rod-like member extending through said openings; devices on said rod-like member providing abutment surfaces facing in the direction of one another and at opposite sides of said overhead and rail members from one another; and a discrete, resilient, flexible, ring-like closed vessel having liquid therein surrounding said rod-like member and between said overhead and rail members and each said abutment surfaces adjacent thereto; said opening in said overhead and rail members being larger than said rod-like member extending therethrough whereby said rod-like member has limited relative universal movement relative to said overhead and rail members.

20. In an overhead, underslung carrier-type material handling system: an overhead member having a plurality of side-by-side openings therethrough; a rail member having a plurality of side-by-side openings therethrough one beneath each of the openings through said overhead member; side-by-side rod-like members extending through said side-by-side openings in said overhead and rail members; devices on said rod-like members providing abutment surfaces surrounding the respective rod-like members facing in the direction of one another and at opposite sides of said overhead and rail members from one another; discrete, resilient, flexible, ring-like closed vessels surrounding said rod-like members and between one of said overhead and rail members and each said abutment surfaces adjacent thereto; conduit means connecting said vessels between said overhead support and said abutment surfaces adjacent thereto; conduit means connecting said vessels between said rail member and said abutment surfaces adjacent thereto; and liquid within said chambers and said conduit means; said opening in said overhead and rail members being larger than said rod-like members extending therethrough whereby said rod-like members have limited relative universal movement relative to said overhead and rail members.

21. In an overhead, underslung carrier-type material handling system an overhead member having a vertical opening therethrough, a rail member having a vertical opening therethrough beneath the opening through said overhead member, a rod-like member extending through said openings, devices on said rod-like member providing abutment surfaces facing in the direction of one another and at opposite sides of said overhead and rail members from one another, and a discrete, resilient, flexible closed vessel having colored liquid therein between one of said overhead and rail members and the said abutment surface adjacent thereto, said opening in said one of said overhead and rail members being larger than said rod-like member extending therethrough whereby said rod-like member has limited universal movement relative to said one of said overhead and rail members.

22. In an overhead, underslung carrier-type material handling system: an overhead member having a plurality of side-by-side openings therethrough; a rail member having a plurality of side-by-side openings therethrough one beneath each of the openings through said overhead member; side-by-side rod-like members extending through said side-by-side openings in said overhead and rail members; devices on said rod-like members providing abutment surfaces surrounding the respective rod-like members facing in the direction of one another and at opposite sides of said overhead and rail members from one another; discrete, resilient, flexible closed vessels connected by a conduit between one of said overhead and rail members and the said abutment surfaces adjacent thereto; and colored liquid within said chambers and said conduit means, said openings in said one of said overhead and rail members being larger than said rod-like members extending therethrough whereby said rod-like members have limited universal movement relative to said one of said overhead and rail members.

23. In an overhead, underslung carrier-type material handling system: an overhead member having a plurality of side-by-side openings therethrough; a rail member having a plurality of side-by-side openings therethrough one beneath each of the openings through said overhead member; side-by-side rod-like members extending through said side-by-side openings in said overhead and rail members; devices on said rod-like members providing abutment surfaces surrounding the respective rod-like members facing in the direction of one another and at opposite sides of said overhead and rail members from one another; resilient, flexible, ring-like closed vessels connected by a conduit surrounding said rod-like members and between one of said overhead and rail members and the said abutment surfaces adjacent thereto; and colored liquid within said chambers and said conduit means, said openings in said one of said overhead and rail members being larger than said rod-like members extending therethrough whereby said rod-like members have limited universal movement relative to said one of said overhead and rail members.

24. In an overhead, underslung carrier-type material handling system: an overhead member having a plurality of side-by-side openings therethrough; a rail member having a plurality of side-by-side openings therethrough one beneath each of the openings through said overhead member; side-by-side rod-like members extending through said side-by-side openings in said overhead and rail members; devices on said rod-like members providing abutment surfaces surrounding the respective rod-like members facing in the direction of one another and at opposite sides of said overhead and rail members from one another; discrete, resilient, flexible, ring-like closed vessels surrounding said rod-like members and between one of said overhead and rail members and each said abutment surfaces adjacent thereto; conduit means connecting said vessels between said overhead support and said abutment surfaces adjacent thereto; conduit means connecting said vessels between said rail member and said abutment surfaces adjacent thereto; and colored liquid within said chambers and said conduit means; said opening in said overhead and rail members being larger than said rod-like members extending therethrough whereby said rod-like members have limited relative universal movement relative to said overhead and rail members.

* * * * *

PO-1050
(5/69)

UNITED STATES PATENT OFFICE
CERTIFICATE OF CORRECTION

Patent No. 3,827,366　　　　　　　　　　Dated August 6, 1974

Inventor(s) KARL A. PAMER

It is certified that error appears in the above-identified patent and that said Letters Patent are hereby corrected as shown below:

Column 5, line 51 - "an" should be --and--.

Column 6, line 23 - "wehreby" should be --whereby--.

Signed and sealed this 29th day of October 1974.

(SEAL)
Attest:

McCOY M. GIBSON JR.　　　　　　　　　　C. MARSHALL DANN
Attesting Officer　　　　　　　　　　　Commissioner of Patents